(12) United States Patent
Lin

(10) Patent No.: US 6,475,271 B2
(45) Date of Patent: Nov. 5, 2002

(54) INK JET INK COMPOSITIONS AND PRINTING PROCESSES

(75) Inventor: John Wei-Ping Lin, Webster, NY (US)

(73) Assignee: Xerox Corporation, Stamford, CT (US)

( * ) Notice: Subject to any disclaimer, the term of this patent is extended or adjusted under 35 U.S.C. 154(b) by 5 days.

(21) Appl. No.: 09/749,696

(22) Filed: Dec. 28, 2000

(65) Prior Publication Data

US 2002/0121220 A1 Sep. 5, 2002

(51) Int. Cl.[7] ............................................... C09D 11/00
(52) U.S. Cl. ................. 106/31.27; 106/31.6; 106/31.58; 106/31.86
(58) Field of Search ...................... 106/31.27, 31.6, 106/31.58, 31.86; 347/100

(56) References Cited

U.S. PATENT DOCUMENTS

| | | | |
|---|---|---|---|
| 4,197,135 A | 4/1980 | Bailey et al. | |
| 4,251,824 A | 2/1981 | Hara et al. | |
| 4,267,088 A | 5/1981 | Kempf | |
| 4,410,889 A | 10/1983 | Bryant et al. | |
| 4,412,224 A | 10/1983 | Sugitani | |
| 4,463,359 A | 7/1984 | Ayata et al. | |
| 4,532,530 A | 7/1985 | Hawkins | |
| 4,601,777 A | 7/1986 | Hawkins | |
| 4,659,382 A | 4/1987 | Kang | |
| 4,840,674 A | 6/1989 | Schwarz | |
| 5,091,005 A | 2/1992 | Mueller et al. | |
| 5,106,415 A | 4/1992 | Davidian | |
| 5,116,409 A | 5/1992 | Moffatt | |
| 5,133,803 A | 7/1992 | Moffatt | |
| 5,139,574 A | 8/1992 | Winnik et al. | |
| 5,145,518 A | 9/1992 | Winnik et al. | |
| 5,181,045 A | 1/1993 | Shields | |
| 5,198,023 A | 3/1993 | Stoffel | |
| 5,207,824 A | 5/1993 | Moffatt et al. | |
| 5,250,107 A | 10/1993 | Bares | |
| 5,281,261 A | 1/1994 | Lin | |
| 5,320,668 A | 6/1994 | Shields | |
| 5,342,440 A | 8/1994 | Wickramanayake | |
| 5,428,383 A | 6/1995 | Shields et al. | |
| 5,476,540 A | 12/1995 | Shields et al. | |
| 5,488,402 A | 1/1996 | Shields et al. | |
| 5,518,534 A | 5/1996 | Pearlstine et al. | |
| 5,531,817 A | 7/1996 | Shields et al. | |
| 5,531,818 A | 7/1996 | Lin et al. | |
| 5,565,022 A | 10/1996 | Wickramanayake | |
| 5,570,118 A | * 10/1996 | Rezanka et al. | ............ 347/100 |
| 5,693,129 A | 12/1997 | Lin | |
| 5,955,515 A | * 9/1999 | Kimura et al. | ............ 106/31.13 |
| 5,985,015 A | * 11/1999 | Kanaya | ..................... 106/31.6 |
| 6,039,793 A | * 3/2000 | Gundlach et al. | ......... 106/31.28 |
| 6,221,142 B1 | * 4/2001 | Wang et al. | ............... 106/31.6 |
| 6,280,513 B1 | * 8/2001 | Osumi et al. | ............... 106/31.6 |
| 6,306,204 B1 | * 10/2001 | Lin | ......................... 106/31.43 |
| 6,332,919 B2 | * 12/2001 | Osumi et al. | .............. 106/31.6 |

FOREIGN PATENT DOCUMENTS

| | | |
|---|---|---|
| EP | 0 704 504 A | 4/1996 |
| EP | 0 714 960 A | 6/1996 |
| EP | 0 719 846 A | 7/1996 |
| EP | 0 909 798 A | 4/1999 |
| EP | 0 911 374 A | 4/1999 |
| EP | 0 985 714 A | 3/2000 |
| EP | 1 035 177 A | 9/2000 |

* cited by examiner

*Primary Examiner*—Helene Klemanski
*Assistant Examiner*—Veronica F. Faison
(74) *Attorney, Agent, or Firm*—Oliff & Berridge, PLC

(57) ABSTRACT

A multicolor ink jet printing process employs an ink jet ink composition comprising water, a colorant of pigment, dye, or mixtures thereof, and a low boiling point additive to produce high quality multicolor ink jet images with minimal intercolor bleed and lines with sharp edges as characterized by a relatively low mid frequency line edge noise (MFLEN) number. The additive is an alcohol or thiol having a boiling point less than or equal to about 115° C. The aforementioned ink jet ink composition can further include an optional additive of alcohol or thiol with a boiling point less than or equal to about 135° C. if necessary. The desired additive increases the ink's drying rate with fast evaporation and an accelerated penetration into a print substrate (e.g. paper) upon printing. As a result, little or minimum residual ink (e.g. carbon black ink) comprising the aforementioned additive is available on the surface of the print substrate to intermix with a previously or subsequently printed ink (e.g. a color ink). As a result, the ink composition and multicolor ink jet printing process of the present invention can produce high quality images with minimal intercolor bleed and low MFLEN.

23 Claims, No Drawings

INK JET INK COMPOSITIONS AND PRINTING PROCESSES

BACKGROUND OF THE INVENTION

1. Field of Invention

The present invention is directed to an aqueous ink composition. More specifically, the present invention is directed to aqueous ink compositions comprising a low boiling point alcohol or thiol as a substrate penetrant additive for use in ink jet printing processes. In addition, the present invention is also directed to an ink jet printing process wherein an aqueous ink composition comprising a low boiling point alcohol or thiol is used in the production of single or multicolor images.

2. Description of Related Art

Ink jet printing is a non-impact printing method that produces droplets that are deposited on a print substrate (recording medium) such as plain paper, coated paper, transparent film (transparency), or textile in response to electronic digital signals. Thermal or bubble jet drop-on-demand ink jet printers have found broad applications as output for personal computers in the office and at home.

In existing thermal ink jet printing processes, the printhead typically comprises one or more ink jet ejectors, each ejector includes a channel communicating with an ink supply chamber, or manifold, at one end and having an opening at an opposite end, referred to as a nozzle. A thermal energy generator, usually a resistor, is located in each of the channels at a predetermined distance from the nozzles. The resistors are individually addressed with a current pulse to momentarily vaporize the ink within each respective channel to form a bubble that expels an ink droplet. As the bubble grows, the ink rapidly bulges from the nozzle and is momentarily contained by the surface tension of the ink as a meniscus. This is a very temporary phenomenon, and the ink is quickly propelled toward a print sheet. As the bubble begins to collapse, the ink remaining in the channel between the nozzle and the bubble starts to move toward the collapsing bubble, causing volumetric contraction of the ink at the nozzle resulting in the separation of the bulging ink from the nozzle as a droplet. The acceleration of the ink out of the nozzle while the bubble is growing provides sufficient momentum and velocity to propel the ink droplet in a substantially straight-line direction towards a print substrate, such as a piece of paper. Subsequently, the ink channel refills by capillary action and is ready for the next repeating thermal ink jet process. Thermal ink jet processes are well known and described in, for example, U.S. Pat. Nos. 4,251,824, 4,410,889, 4,412,224, 4,463,359, 4,532,530, 4,601,777, 5,139,574, 5,145,518, and 5,281,261, the entire disclosures of which are incorporated herein by reference. Because the droplet of ink is emitted only when the resistor is actuated, this type of thermal ink jet printing is known as "drop-on-demand" printing. Other types of drop-on-demand printing such as piezoelectric ink jet printing and acoustic ink jet printing are also known.

Continuous ink jet printing is also known. In continuous ink jet printing systems, ink is emitted in a continuous stream under pressure through at least one orifice or nozzle. Multiple orifices or nozzles can be used to increase imaging speed and throughput. The ink is perturbed while being ejected from an orifice, causing the ink to break up into droplets at a fixed distance from the orifice. At the point of break-up, the electrically charged ink droplets pass through an applied electrode that switches on and off in accordance with digital data signals. Charged ink droplets pass through a controllable electric field that adjusts the trajectory of each ink droplet in order to direct it to either a gutter for ink deletion and recirculation or to a specific location on a recording substrate (print substrate) to create images.

In an ink jet printing apparatus, the printhead typically comprises a linear array of ejectors, and the printhead moves relative to the surface of the print substrate, either by moving the print substrate relative to a stationary printhead, or vice-versa, or both. In some types of apparatuses, at least a relatively small print head supplied with an ink moves across a print sheet numerous times in swaths in order to complete an image. For multi-color ink jet printing, a set of printheads and ink (e.g. cyan, magenta, yellow and black) can move across the print substrate numerous times in swathes and disperse selected inks in any desired patterns (e.g., 1/8, 1/4, 1/2, fulltone (1/1)) according to digital signals. The speed of this type of single or multiple color ink jet printing on a substrate is determined by the moving speed of the printheads across the print substrate, ink jetting frequency (or frequency response), and the desired number of swathes needed for printing. The printing speed of this type of ink jet apparatus can be increased if two or more print heads are budded together to form a partial-width array printhead for printing each ink in a monochrome or multicolor ink jet printing system. The partial-width ink jet printhead has more ink jet nozzles per printhead, and can deliver a large number of ink droplets across the substrate in a swath in a short period of time. Monochrome or multicolor ink jet printing apparatuses using one or several partial-width printheads may have a faster printing speed than current commercial ink jet printers.

Alternatively, a printhead that consists of an array of ejectors (e.g., several butted printheads to give a full-width array printhead) and extends the full width of the print substrate may pass an ink down once onto the print substrate to give full line images, in what is known as a "full-width array printer." When the printhead and the print substrate are moved relative to each other, image-wise digital data is used to selectively activate the thermal energy generators in the ink jet printhead over time so that the desired image will be created on the print substrate at a fast speed. For multi-color inkjet printing, several full-width array printheads and inks (e.g., cyan, magenta, yellow, and black) can be used to deliver multiple color inks onto a print substrate. This type of multi-color ink jet printing process is capable of printing multiple color images and monochrome color images on a print substrate at a much faster speed (e.g., more than five pages of full color images per minute) than current commercial color ink jet printers.

In multicolor ink jet printing processes, several inks can be printed on a print substrate. In some instances, two different inks can be printed next to each other. Intercolor bleed can occur if the inks are not dried properly or if the printing process is too fast for the inks to set. Undesired ink mixing on a print substrate, especially on the surface of a plain paper, can cause distorted images near the border of two inks. After the inks dry, the border of the two inks can appear irregular with poor edge sharpness (or raggedness) due to the invasion of one ink into the other. Such bleed images are visibly unattractive. This phenomenon is generally called intercolor bleed. Intercolor bleed occurs particularly when a darker colored ink (such as a black ink) and a lighter colored ink (such as a yellow ink, a cyan ink, a magenta ink, or the like) are printed next to each other, because of the high contrast between the two colors. Intercolor bleed can also occur when two color inks are printed next to each other (for example yellow ink next to magenta ink, yellow ink next to cyan ink, magenta ink next to cyan ink or the like). The severity of the intercolor bleed generally is affected by the type and composition of the ink, absorption rate of the ink on a print substrate, printhead design, ink drop mass, ink dot size and method and speed of printing. As a result, there is a need to reduce intercolor bleed and to produce high quality multicolor ink jet images on print substrates, including plain and coated papers, transparencies, textiles and other desired substrates.

U.S. Pat. No. 5,091,005, the disclosure of which is totally incorporated herein by reference, discloses inks comprising, by weight, from about 4% to about 10% foramide, from about 1% to about 10% dye, and the balance water, that when printed on paper from an ink jet printer exhibit improved resistance to bleed, especially when printed at a rate up to about 3.7 kHz.

U.S. Pat. No. 5,116,409, the disclosure of which is totally incorporated herein by reference, discloses the alleviation of color bleed (the invasions of one color into another on the surface of a print medium) using ink jet inks by employing zwitterionic surfactants (pH-sensitive or pH-insensitive) or ionic or nonionic amphiphiles. The inks comprise a vehicle and a dye. The vehicle typically comprises a low viscosity, high boiling point solvent, one or two amphiphiles at concentrations above their critical micelle concentration (cmc), while the dye typically comprises any of the dyes commonly employed in ink jet printing. The amount of surfactant/amphiphile is described in terms of its critical micelle concentration (cmc), which is a unique value for each amphiphile. Above the cmc, micelles form, that attract the dye molecule and thus control the color bleed. Below the cmc, there is no micelle formation, and thus no control of the color bleed.

U.S. Pat. No. 5,106,415, the disclosure of which is totally incorporated herein by reference, discloses the alleviation of color bleed using ink jets by employing zwitterionic surfactants (pH-sensitive or pH-insensitive) or ionic or nonionic amphiphiles. The inks of the invention comprise a vehicle and a cationic dye. The vehicle typically comprises a low viscosity, high boiling point solvent, one or two amphiphiles at concentrations above their critical micelle concentration (cmc), while the dye typically comprises any of the dyes commonly employed in ink jet printing. The amount of surfactant/amphiphile is described in terms of critical micelle concentration (cmc), which is a unique value for each amphiphile. Above the cmc, micelles form, which attract the dry molecule and thus control the color bleed. Below the cmc, there is no micelle formation, and thus no control of the color bleed.

U.S. Pat. No. 5,133,803, the disclosure of which is incorporated herein by reference in its entirety, discloses the control of color bleed using ink jet inks employing high molecular weight colloids, such as alignates, in conjunction with amphoteric surfactants and/or nonionic amphiphiles. The inks disclosed comprise a vehicle and a dye. The vehicle typically comprises a low viscosity, high boiling point solvent and one or two surfactants at concentrations above their critical micelle concentration (cmc), while the dye typically comprises any of the dyes commonly employed in ink jet printing. The amount of surfactant is described in terms of critical micelle concentration (cmc), which is a unique value for each surfactant system. Above the cmc, colloidal species form, which attract the dye molecules and thus control color bleed. Below the cmc, there is no colloid formation, and thus poor control of color bleed.

U.S. Pat. No. 5,181,045, the disclosure of which is incorporated herein by reference in its entirety, discloses certain dyes that become insoluble under specific and well-defined pH conditions. By forcing a dye to become insoluble on the page, migration of the dye is inhibited, thereby helping to reduce bleed between inks of different colors. The dye is forced out of solution from the ink by contact with another ink having the appropriate pH (either higher or lower than the first ink).

U.S. Pat. No. 5,320,668, the disclosure of which is incorporated herein by reference in its entirety, discloses certain colorants that become insoluble under specific and well defined pH conditions. By forcing a colorant to become insoluble on the page, migration of the colorant is inhibited, thereby helping to reduce color bleed between inks of different colors. The colorant is forced out of solution from the ink by contact with another ink having the appropriate pH (either higher or lower than the first ink). In particular, an ink containing a colorant comprising a pigment in combination with a pH sensitive dispersant is used in conjunction with an ink of the appropriate pH.

U.S. Pat. No. 5,342,440, the entire disclosure of which is incorporated herein by reference, discloses water insoluble black dyes that are formulated in a microemulsion black ink. When printed adjacent to color inks (yellow, magenta, cyan) containing water-soluble dyes, bleed does not occur between the black and color dyes.

U.S. Pat. No. 5,476,540, the entire disclosure of which is incorporated herein by reference, discloses a method for controlling color bleed between adjacent multicolor ink regions on a print medium. A first composition containing a gel species and a color agent is brought into contact on a region of the print medium with a second composition having a color agent and a gel initiating species or chemical conditions which bring about gelation. In alternative embodiments, the print medium can be pretreated with either a gel forming species or a gel initiating species (with colorant), respectively. The formation of the gel upon the print medium impedes the movement of the color agent or agents and thus reduces the color bleed between adjacent zones in a multicolored printed image on a print medium.

U.S. Pat. No. 5,531,817, the entire disclosure of which is incorporated herein by reference, discloses the control of color bleed using ink jet inks by employing either high molecular weight polymers that exhibit a reversible gelling nature with heat or certain amine oxide surfactants that undergo sol-gel transitions. The inks further include a vehicle and a dye. The vehicle typically comprises a low viscosity, high boiling point solvent and water. Certain high molecular weight polymers, under the correct solution conditions, can form gels which can be subsequently melted by heating of the gel. When the melted gel is cooled, it reforms into a gel. The viscosity of an ink employing a gel can then decrease to a viscosity low enough to permit jetting from the print cartridge. After leaving the print cartridge, the melted gel again reforms into a highly viscous gel to immobilize the droplet of ink and prevent migration on the media. Therefore, two drops of different colors, when printed next to each other are inhibited from migrating or bleeding into one another.

U.S. Pat. No. 5,565,022, the entire disclosure of which is incorporated herein by reference, discloses ink jet ink compositions that exhibit fast dry times and bleed free prints when printed onto a print medium so that the throughput of an ink jet printer can be increased. The ink compositions comprise (a) at least one dye; (b) at least one high boiling, water insoluble organic compound; (c) at least one amphiphile; and (d) water. The dye can be either water-soluble or water insoluble and the high boiling point organic compound has a vapor pressure low enough so that only water evaporates from the ink during normal printing operations. The amphiphile is present in amount sufficient to solubilize the water-insoluble organic compound in the water. Preferably, the amphiphile belongs to a class of compounds known as the hydrotropes.

U.S. Pat. No. 5,198,023, the entire disclosure of which is incorporated herein by reference, discloses an ink set in which bleed between yellow and black inks is reduced by using a cationic yellow dye in the yellow ink and an anionic dye in the black ink. Bleed is further reduced by adding a multivalent precipitating agent to the yellow ink. With regard to bleed between yellow and other color inks (cyan and magenta), bleed is reduced by also employing anionic dyes in the other color inks.

U.S. Pat. No. 5,428,383 and U.S. Pat. No. 5,488,402, the entire disclosures of which are incorporated herein by reference, disclose a method for controlling color bleed in multicolor thermal ink jet printing systems. To control color bleed between any two ink compositions in a multi-ink system, at least one of the ink compositions will contain a precipitating agent (such as a multivalent metal salt). The precipitating agent is designed to react with the coloring agent in the other ink composition of concern. As a result, when the two ink compositions come in contact, a precipitate forms from the coloring agent in the other ink composition that prevents migration thereof and color bleed problems. This technique is applicable to printing systems containing two or more ink compositions, and enables distinct multicolor images to be produced without the problems normally caused by color bleed.

U.S. Pat. No. 5,518,534, the entire disclosure of which is incorporated herein by reference, discloses an ink set for alleviating bleed in multicolor printed elements employing a first ink and a second ink, each containing an aqueous carrier medium and a colorant; the colorant of the first ink being a pigment dispersion and the second ink containing a salt of an organic acid or mineral acid having a solubility of at least 10 parts in 100 parts of water at 25° C.

U.S. Pat. No. 5,250,107, the entire disclosure of which is incorporated herein by reference, discloses a waterfast ink composition and a method of making the same. A selected chemical dye having at least one functional group with an extractable hydrogen atom thereon (such as —COOH, —NH$_2$, or —OH) is combined with an ammonium zirconium polymer salt (such as ammonium zirconium carbonate, ammonium zirconium acetate, ammonium zirconium sulfate, ammonium zirconium phosphate, and ammonium zirconium oxalate). The resulting mixture preferably contains about 0.01–5.0% by weight ammonium zirconium polymer salt and about 0.5–5.0% by weight chemical dye. Upon dehydration of the mixture, the ammonium zirconium polymer salt and chemical dye form a cross-linked dye complex that is stable and waterfast. The mixture can be dispensed into a variety of substrates (e.g. paper) using thermal ink jet or other printing systems.

U.S. Pat. No. 4,267,088, the entire disclosure of which is incorporated herein by reference, discloses coatings particularly useful as marking inks in which an epichlorohydride-modified polyethyleneimine and ethylene oxide-modified polyethyleneimine cooperate in aqueous solution to form a composition capable of application to form deposits adherent to most materials and resistant to most organic solvents but readily removed by water.

U.S. Pat. No. 4,197,135, the entire disclosure of which is incorporated herein by reference, discloses an ink for use in ink jet printers containing a water soluble dye and a polyamine containing 7 or more nitrogen atoms per molecule, with the ink composition having a pH of 8 or above, the pH limit being dye composition dependent. The ink has improved waterfastness over an equivalent ink formulation without the polyamine additive.

U.S. Pat. No. 4,659,382, the entire disclosure of which is incorporated herein by reference, discloses an ink jet composition comprising a major amount of water, a hydroxyethylated polyethyleneimine polymer, and a dye component, wherein the polymer has incorporated therein from about 65 to about 80 percent by weight of the hydroxyethyl groups.

U.S. Pat. No. 5,693,129, the disclosure of which is totally incorporated herein by reference, discloses an ink jet ink composition that comprises water; a colorant selected from the group consisting of a dye, a pigment, and a mixture of a dye and a pigment; and a material selected from the group consisting of (1) a hydroxyamide derivative having at least one hydroxyl group and at least one amide group; (2) a mercaptoamide derivative having at least one mercaptol group and at least one amide group; (3) a hydroxythioamide derivative having at least one hydroxyl group and at least one thioamide group; (4) a mercaptothioamide derivative having at least one mercaptol group and at least one thioamide group; (5) an oxyalkylene (alkyleneoxide) reaction product of the above derivatives; (6) a thioalkylene (alkylenesulfide) reaction product of the above said derivatives; and (7) mixtures thereof. The inks comprising the ink jet composition exhibit good latency especially in a high resolution thermal ink jet printhead (e.g. 600 spi) and can be printed onto a print substrate either with or without heat for the drying to give excellent images with reduced curl and cockle.

Although the above compositions and processes are suitable for their intended purposes, there remains a need for improved multicolor thermal ink jet printing processes. In addition, a need remains for multicolor thermal ink jet printing processes wherein high quality images on a print substrate (e.g. plain papers, etc.) can be obtained. Furthermore, there is a need for improving multicolor thermal ink jet printing processes wherein the printed images exhibit reduced intercolor bleed (high quality color images) when an ink comprising a low boiling alcohol or thiol is printed adjacent to another ink on a print substrate. Further, a need remains for multicolor thermal ink jet printing processes wherein the prints generated by an ink exhibit excellent image quality. In particular, there is an urgent need for an ink (especially a carbon black ink) that provides good MFLEN (Mid Frequency Line Edge Noise using a Fourier Transform method) and intercolor bleed performance. In addition, there is a need to decrease drying time of a pigment ink (such as a carbon black ink) without causing image degradation.

SUMMARY OF THE INVENTION

The present invention is directed to an ink jet ink composition that comprises water, a colorant of dye, pigment, or a mixture of dye and pigment, and an ink additive with a low boiling point alcohol and/or thiol, as well as printing processes using such a composition. In particular, the present invention is directed to an ink jet ink composition comprising a colorant of pigment (particularly a pigment (e.g. carbon black)), dye, or mixture thereof, and a low boiling point penetrant additive. The low boiling point penetrant additive allows the ink to dry fast on a substrate (print substrate) to produce high quality images and sharp edges by enabling the ink to rapidly penetrate into the print substrate upon printing. Because the ink additive evaporates quickly upon printing, the ink in some cases may assume a higher surface tension and may prevent undesired feathering. In addition, the present invention also directed to the improvement of a multicolor ink jet printing process that can minimize intercolor bleed between two neighboring inks on a print substrate and maintain excellent print quality of text images including lines and graphics. The multicolor ink jet printing process of the present invention may comprise at least a pigment ink containing an ink additive of low boiling alcohol or thiol.

DETAILED DESCRIPTION OF PREFERRED EMBODIMENTS

According to the present invention, at least one ink in an ink jet printing process comprises a low boiling point alcohol or thiol (an ink additive) to accelerate the penetration of the ink into a print substrate with a faster drying rate (short dry time). The aforementioned ink (or ink composition) comprising the low boiling point alcohol or thiol is preferably a pigment ink, such as a carbon black ink, although it can also be a dye-based ink. In another embodiment of this invention the ink jet printing process comprises printing at least one ink having a low boiling point additive of an alcohol or thiol in its composition that reduces intercolor bleed when the ink is printed adjacent to another ink (e.g. a fast dry dye-based color ink).

The penetrant or low boiling point additive of the ink jet ink composition of the present invention is provided in order to minimize the amount of residual ink on the surface of the print substrate that is available to participate in undesirable intercolor bleed between two neighboring inks (e.g. a black ink and a yellow ink, a black ink and a cyan ink, black ink and a magenta ink, etc.). The penetrant (low boiling point additive of alcohol or thiol) of the present invention minimizes the amount of and/or time a residual ink remains on the surface of the print substrate by allowing the ink to rapidly penetrate into the print substrate immediately after being printed onto the substrate surface. The low boiling point additive of alcohol or thiol also can quickly evaporate. As a result, the residual ink remaining on the surface of the substrate is substantially reduced, thereby reducing the likelihood of intermixing between residual ink and other color inks printed in bordering areas. In addition, the low boiling point ink additive can evaporate quickly and allows the printed ink to produce excellent line edge acuity and sharpness (Low Mid Frequency Line Edge Noise (MFLEN)) without causing significant image deterioration (e.g. due to feathering, etc.). In addition, the appropriate use of low boiling point alcohols or thiols as ink additives can maintain good stability of a pigment ink including a carbon black ink comprising either chemically modified carbon black particles or carbon black particles that are stabilized by a pigment dispersant.

According to the present invention, the low boiling point penetrant additive can be included in one or more inks of an ink set in a multicolor ink jet printing process. In addition, the low boiling point penetrant additive can be incorporated into an ink jet ink that is used in a mono-color printing apparatus (e.g. black ink jet printing apparatus). Thus, for example, the present invention applies equally to a printing apparatus that prints multi-color images, as well as to a printing apparatus that prints only a single-color image (e.g. black). However, it will be appreciated that the benefits provided by the present invention are particularly applicable to a multi-color printing process, wherein good black text on plain papers is required and the intercolor bleed reduction is a great concern for the production of multicolor images.

Also according to the present invention, the low boiling point penetrant additive can be included in any one or more of the various colored inks in an ink set. Thus, for example, the low boiling point penetrant additive can be included in one or more of the colored inks, such as the black, magenta, yellow, or cyan inks. However, particular benefits are provided by the present invention when the low boiling point penetrant additive is included in the black inks, particularly in carbon black-based inks, since these inks typically are formulated to achieve good print quality but have a longer drying time as compared to inks of other colors.

Generally, various low boiling point penetrant additives can be used. In a preferred embodiment of the present invention, at least one of a set of multi-color ink jet inks comprises an alcohol or thiol additive having a boiling point less than or equal to about 115° C. (at atmospheric pressure, 760 mm Hg). Moreover, in an alternative preferred embodiment of the present invention, proposed alcohols and thiols can be used together (jointly) with a second alcohol or thiol having a boiling point that is less than or equal to about 135° C. (at atmospheric pressure, 760 mm Hg; e.g. B.P. of the ink additive is between 115° C. to 135° C.).

Suitable additives of low boiling point alcohols or thiols with a boiling point less than or equal to about 115° C. include, but are not limited to, t-butyl alcohol (2-methyl-2-propanol); 1-methyl-1-propanol; 2-butanol; 2-methyl-1-propanol (isobutyl alcohol); isopropanol; 2-propyn-1-ol (Propargyl alcohol); 1-chloro, 1-propanol; ethanol; methanol; 2-buten-1-ol, 3-buten-2-ol; 3-butyn-2-ol; 1-butanethiol; t-butylthiol; 1-methyl-1-propanethiol; 2-methyl-1-propanethiol; 2-methyl-2-propanethiol; cyclopropanol; thiocyclopropanol; and the like; and mixtures thereof.

In addition the alcohols or thiols with a boiling point ≦135° C. can also be used jointly in ink jet inks with the aforementioned materials (those with a boiling point less than or equal to about 115° C.) as mixed additives and they include, but are not limited to, 1-butanol; 3-methyl-1-butanol; 2,3-dimethyl, 1-butanol; 3,3-dimethyl, 1-butanol; 2-methyl-1-butanol (d and 1); 2,3,3-trimethyl-1-butanol; 2-pentanol, 3-pentanol; 2-pentanol; 2,4-dimethyl, 2-pentanol; 2-methyl, 2-pentanol; 3-methyl, 2-pentanol; 4-methyl, 3-pentanol; 2-methyl, 3-pentanol; 3-methyl, 1-propanol; 2-chloro, 1-propanol; 1-chloro, 1-propanol; 1-chloro-2-methyl-2-propanol; 2-chloro-2-methyl-1-propanol 2,2-dimethyl-1-propanol (tert-butylcarbinol, neopentyl alcohol); 3-fluoro-1-propanol; 1-methoxy-2-propanol; 1-ethoxy-2-propanol; 1-butanethiol, 2-methyl; 1-butanethiol, 3-methyl; and mixtures thereof These alcohols and thiols have a boiling point in the range of 115–135° C. at atmospheric pressure.

In embodiments of the present invention, the low boiling point alcohol or thiol is present in an effective amount to provide the desired effect of increased penetration into the print substrate, without significantly sacrificing print quality, printing characteristics, or stability of the ink composition. Thus, for example, the low boiling point alcohol or thiol can be present in any desired amount of from about 0.01 percent to about 8 percent by weight of the ink composition. Preferably, the low boiling point alcohol or thiol is present in an amount of from about 0.1 percent to about 6 percent, more preferably from about 0.2 percent to about 5 percent, by weight of the ink composition. However, amounts outside of these ranges can also be used, as desired.

Any ratio of the alcohol or thiol with a B.P ≦115° C. to the alcohol or thiol with a B.P. ≦135° C. can be used in this invention as along as the objective(s) of the present invention can be achieved. The higher boiling point alcohols and thiols have lower vapor pressure and are less prone to catch fire. However, they evaporate at a relatively slower rate. An optimum ratio should be used to accommodate all the needs and requirements.

In addition to the above additives, the ink composition of the present invention can also include one or more of the following: a humectant, a surfactant, a pigment dispersing agent, a pH buffer, a biocide, an anti-curl agent, an anti-bleed agent, a drying accelerating agent, a polymeric binder, an anti-clogging agent, and a latency enhancer etc.

Various humectants can be used in the ink composition of the present invention. Suitable humectants and co-solvents include, but are not limited to, glycol derivatives, including ethylene glycol, diethylene glycol, propylene glycol, dipropylene glycol, polyethylene glycol, polypropylene glycol, poly(ethylene-co-propylene) glycol, and the like, as well as their reaction products with alkylene oxides, including ethylene oxides, including ethylene oxide and propylene oxide; triol derivatives containing from about 3 to about 40 carbon atoms, including glycerine, trimethylpropane, 1,3,5-pentanetriol, 1,2,6-hexanetriol, and the like as well as their reaction products with alkylene oxides, including ethylene oxide, propylene oxide, and mixtures thereof; diols containing from about 2 to about 40 carbon atoms, such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol, neopentylglycol, (2,2-dimethyl-1,3-propaediol), and the like, as well as their reaction products with alkylene oxides, including ethylene oxide and propylene oxide in any desirable molar ratio to form materials with a wide range of molecular weights; sulfoxide derivatives containing from about 2 to about 40 carbon atoms, including dialkylsulfides (symmetric and asymmetric sulfoxides) such as dimethylsulfoxide, methylethylsulfoxide, alkylphenyl sulfoxides, and the like; sulfone derivatives (symmetric and asymmetric sulfones) containing from about 2 to about 40 carbon atoms, such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, dimethylsulfolane, and the like; amides with from about 2 to about 40 carbon atoms, such as N-alkylamides, N,N-dialkyl amides, N,N-alkyl phenyl amides, 2-pyrrolidone (a cyclic amide), n-methylpyrrolidone (a cyclic amide), N-cyclohexylpyrrolidone, N,N-dimethyl-p-toluamide (aromatic), N,N-dimethyl-o-toluamide, N,N-diethyl-m-toluamide, and the like; ethers, such as alkyl ether derivatives of various alcohols, ether derivatives of triols and diols, including butylcarbitol, hexylcarbitol, triolethers, alkyl ethers of polyethyleneglycols, alkyl ethers of polypropyleneglycols, alkyl ethers of phenylpolyethyleneglycols, and the like; urea and urea derivatives; inner salts such as betaine, and the like; thio (sulfur) derivatives of the aforementioned materials (humectants), including thioethyleneglycol, thiodiethyleneglycol, trithio- or dithio-diethyleneglycol, and the like; hydroxyamide derivatives, including acetylethanolamine, acetylpropanolamine, propylcarboxyethanolamine, propylcarboxypropanolamine, and the like; reaction products of the aforementioned materials (humectants) with alkylene oxides; and mixtures thereof.

Further examples of suitable humectants and other additives are disclosed, for example, in U.S. Pat. Nos. 5,281,261, 5,531,818, 5,693,129, 4,840,674, 5,365,464, copending application U.S. Ser. No. 08/782,237, and copending application U.S. Ser. No. 08/876,410, the disclosures of which are incorporated herein by reference in their entireties.

Various nonionic stabilizing agents or surfactants can also be used in conjunction with the ink composition of the present invention. Suitable nonionic stabilizing agents or surfactants include, but are not limited to, ethoxylated monoalkyl or dialkyl phenols, including Igepal® CA and Co series materials (Rhone-Poulenc Co., such as Igepal® CA-630, CO-630, and the like); Surfynol® series materials from Air Products and Chemicals Co.; and Triton® series materials (from Union Carbide Company). These anionic surfactants or dispersants can be used alone or in combination with anionic or cationic dispersants.

Various anionic, cationic and nonionic pigment dispersing agents can also be used in conjunction with the ink composition of the present invention. Suitable pigment dispersing agents include, but are not limited to, anionic dispersants such as polymers and copolymers of styrene sulfonate salts (such as Na+, Li+, K+, Cs+, Rb+, substituted and unsubstituted ammonium cations, and the like), unsubstituted and substituted (e.g. alkyl, alkoxy, substituted naphthalene derivatives, and the like), naphthalene sulfonate salts (such as Na+, Li+, K+, Cs+, Rb+, substituted and unsubstituted ammonium cations, and the like) and an aldehyde derivative (such as unsubstituted alkyl aldehyde derivatives including formaldehyde, acetaldehyde, propylaldehyde, and the like), maleic acid salts, mixtures thereof, and the like. They can either be in solid form or water solutions. Examples of such dispersants include, but are not limited to, commercial products such as Versa® 4, Versa® 7, Versa® 77 (National Starch and Chemical Co.); Lomar® D (Diamond Shamrock Chemicals Co.); Daxad®19, Daxad® K (W. R. Grace Co.); Tamol® SN (Rohn & Haas); and the like. Some preferred dispersants comprise naphthalene sulfonate salts, especially a condensation product of naphthalenesulfonic acid or its salts (such as Na+, Li+, K+, Cs+, Rb+, substituted and unsubstituted cations, and the like) and formaldehyde as well as copolymers of various acrylic acids salts, or methacrylic acid salts. Also, nonionic dispersants or surfactants can be used in ink jet inks of the present invention, such as ethoxylated monoalkyl or dialkyl phenols including Igepal® CA and CO series materials (Rhone-Poulenc Co.) Briji® Series materials (ICI Americas, Inc.), and Triton® series materials (Union carbide Company). These nonionic surfactants or dispersants can be used alone or in combination with the aforementioned anionic and cationic dispersants.

The ratio of pigment to aforementioned pigment dispersants according to the present invention ranges from about 1/0.1 to about 1/3, preferably from about 1/0.1 to about 1/2, and most preferably from about 1/0.15 to about 1/1.8, although it can be outside of this range. The ratio of naphthalene substituent to aldehyde (e.g. formaldehyde, acetaldehyde) in the aforementioned anionic dispersant condensation product is generally about 1:1, although this ratio can be different depending on the stoichiometry of the feed stock and reaction condition, and can be readily adjusted to obtain a dispersant having a desired molecular weight and the desired ratio of naphthalene substituent to aldehyde. The remainder of the dispersant can comprise active ingredients such as water, solvent or humectant. The weight average molecular weight of the dispersant is generally less than 20,000, preferably less than 13,000, and more preferably less than 10,000. The pigment dispersion should contain enough dispersant to stabilize the pigment particle dispersion such as viscosity, stability and optical density.

Various pH buffers can also be included in the ink composition of the present invention. Suitable pH buffers include, but are not limited to, acids, bases, phosphate salts, carboxylate salts, sulfite salts, sulfate salts, amine salts, imidazole, and its salts, and the like. Such pH controlling agents are generally present in an amount from 0 to about 10% by weight of the ink, preferably from about 0.001 to about 5% by weight of the ink and more preferably from about 0.01 to about 5% by weight of the ink, although the amount can be outside of these ranges.

The ink composition of the present invention can also include various biocides. Suitable biocides include, but are not limited to, biocides such as Dowicil® 150, 200, and 75, benzoate salts, sorbate salts, Proxcel® (available from ICI), and the like. When used, such biocides are generally present in an amount from 0 to about 10% by weight of the ink, preferably from about 0.001 to about 8% by weight of the ink, and more preferably from about 0.01 to about 4% by weight of the ink, although the amount can be outside of these ranges.

The ink jet ink composition of the present invention can also comprise various anti-curl and/or anti-cockle agents. Suitable agents include, but are not limited to, those disclosed in U.S. Pat. No. 5,356,464 to Hickman et al. and U.S. Pat. No. 5,207,824 to Moffatt et al.

The ink composition of the present invention can also comprise various anti-bleed agents and/or drying accelerating agents to reduce intercolor bleed. Suitable agents include, but are not limited to, penetrants including hydroxyethers, including alkyl cellusolves® and alkyl carbitolsg such as hexyl carbitol® and butyl carbitol; polyethylene glycol ether derivatives (such as alkyl ethers including methyl, ethyl, propyl, butyl, pentyl, hexyl, dodecyl, lauryl, stearyl, ether derivatives, phenyl and alkylphenyl ether derivatives of polyethyleneglycols, and the like); and polypropyleneglycol ether derivatives (such as alkyl ethers including methyl, ethyl, propyl, butyl, pentyl, hexyl, dodecyl, lauryl, stearyl ether derivatives, phenyl and alkylphenyl, ether derivatives of polypropylene glycols, and the like); and the like, and mixtures thereof.

Various polymeric binders can also be used in conjunction with the ink composition of the present invention to adjust the viscosity of the composition. Suitable polymeric binders include, but are not limited to, water soluble polymers and copolymers such as gum arabic, polyacrylate salts, polymethacrylate salts, polyvinyl alcohols, hydroxypropylenecellulose, hydroxyethylcellulose, polyvinylpyrrolidinone, polyvinylether, starch, polysaccharides, polyethyleneimines with or without being derivatized with ethylene oxide and propylene oxide including the Discole® series (DKS International); the Jeffamine® series (Texaco); and the like. Polymeric additives may be present in the ink jet inks of the present invention in amounts from 0 to about 10% by weight of the total ink weight, preferably from about 0.001 to about 8% by weight of the total weight of the ink, and more preferably from about 0.01 to about 5% by weight of the total ink weight, although the amount can be outside these ranges.

The ink composition of the present invention can also include various anti-clogging agents to prevent clogging. Suitable anti-clogging agents include but are not limited to polyethyleneglycol, polypropyleneglycol, poly(ethylene-co-propylene)glycol, polyhydric materials (materials containing more than one hydroxyl group), condensation products of diols or triols (glycerine, trimethylopropane, triethanolamine, etc.) with ethyleneoxide and/or propyleneoxide.

Various anti-clogging agents can also serve as latency enhancers to increase the latency of the ink of this invention. Long latency is preferred so that the ink does not clog the nozzle of the printhead and reduce the need for frequent printhead maintenance.

The ink compositions of the present invention can be suitably used in various printing processes and apparatus. For example, the ink compositions of the present invention can be used in a variety of ink jet printing processes and apparatus including, but not limited to, continuous ink jet printing and drop-on-demand printing including piezoelectric ink jet printing, acoustic ink jet printing, and thermal ink jet printing. The ink compositions can be used by themselves, as in a single-color (monochrome) printing process or apparatus, or in combination with other ink compositions, such as in a multi-color ink jet printing process. The ink composition of present invention comprising at least one of the low boiling point alcohols and thiols is especially useful for formulation of a pigment ink such as a carbon black ink. The carbon black ink tends to be unstable when relatively more nonpolar or hydrophobic materials or penetrants are used to facilitate the ink drying. The low boiling additive of alcohols and thiols (B.P.$\leq$115° C.) have a relatively smaller number of carbon atoms and higher surface tension than similar materials with a high boiling point and a larger number of carbon atoms. Unlike other potent ink penetrants, the additives of present invention in general do not cause significant degradation in image quality if they are used properly. In addition, the low boiling point alcohols and thiols of the present invention do not seriously destabilize a pigment ink when they are used properly. Due to low boiling point nature of the additives of the present invention, it is preferred to have their boiling point above 80° C. to avoid any possible safety issue such as flammability during transportation. If necessary, the aforementioned additives of alcohols and thiols (B.P.$\leq$115° C.) may also be used in conjunction with similar alcohols and thiols with a boiling point of $\leq$135° C. (e.g. boiling point ranges from 135° C. to 135° C.) in ink jet ink compositions and processes of the present invention.

The ink jet printing process (e.g. multicolor ink jet printing process) of the present invention can include the printing of ink in any chosen orders (e.g. cyan, yellow, magenta, black; black, cyan, magenta, yellow; black, cyan, yellow, magenta; etc.). For example, a color ink (e.g. cyan, magenta, yellow) can be printed first followed by a carbon black ink (or a black ink) comprising a low boiling point additive of alcohol and/or thiol or vice versa. Moreover the multicolor ink jet printing process of the present invention can be performed either with or without heating of the substrate. The print substrate can be optionally heated at any stage of inkjet printing process of the present invention including before, during, after, and combinations thereof. Suitable heating methods include, but are not limited to, radiant heating, lamp heating, platen or belt heating, and the like. The ink jet printing process of the present invention can also include pixel management, underprinting, overprinting and partial toning (e.g. $\frac{1}{16}$, $\frac{1}{8}$, $\frac{1}{4}$, $\frac{1}{2}$, etc.), as are known in the art. The multicolor ink jet printing process of the present invention can include either pigment- or dye-based inks with at least one ink comprising a low boiling additive of alcohol and thiol with B.P.$\leq$115° C. In addition, the ink additive of the present invention can be mixed with water, ink vehicles, or other ink additives (e.g. humectants, surfactants, pigment dispersants, jetting aids, biocides, anti-curl agents, anti-bleed agents, pH buffering agents, polymeric additives, etc.) including alcohols and thiols with B.P.$\leq$135° C.

The multicolor ink jet printing process of the present can be conducted using many different printers employing various printing methods including, but not limited to, thermal ink jet printing, acoustic ink jet printing, continuous stream ink jet printing, and piezoelectric ink jet printing. In addition, the present invention can also comprise jetting at least one ink through a printhead capable of printing at least about 360 spots per inch, preferably at least about 400 spots per inch, more preferably at least about 420 spots per inch, and most preferably at least 600 spots per inch or more.

In an exemplary embodiment, the printing process of the present invention includes several steps. First, a black ink, such as a carbon black ink (containing either chemically modified carbon black particles or carbon black particles stabilized with a pigment dispersant), comprising a low boiling point alcohol or thiol can be printed onto a print substrate. Once the black ink has been printed, color inks can then be printed. By printing in this order, the black ink comprising the alcohol or thiol penetrant can quickly penetrate the surface of the print substrate. Rapid print substrate penetration reduces the amount of residual black ink remaining on the surface of the substrate that can mix with later printed color inks, and thereby minimizes intercolor bleed. A long delay between printing of the black ink and a subsequent color ink (especially a yellow ink) can be used to further minimize intercolor bleed.

In an alternative embodiment of the multicolor ink jet printing process of the present invention, a color ink can be printed before printing the black ink (e.g. carbon black ink) comprising the low boiling point alcohol or thiol additive. In this case, because color inks are generally fast drying, the color ink rapidly penetrates the print substrate surface and dries. The carbon black ink can then be selectively printed (e.g. adjacent to, on top of, or below a color ink) on the print substrate surface afterward. Selective printing of the black ink can be done, for example, using a partial toning technique if necessary. In such cases, black ink images can be completed using multiple printing processes (e.g. partial printing in multiple swaths, etc.) to further reduce the incidence of intercolor bleed. In this case, because the black ink composition of the present invention comprises a low boiling point penetrant additive, the black ink composition dries more rapidly than conventional carbon black inks with high surface tension (e.g. those without the alcohol or thiol additive), thereby minimizing feathering and undesirable intermixing that may otherwise occur between the carbon black ink and the previously printed color ink.

Regardless of the specific order of printing, the ink jet ink composition and process of the present invention substantially reduce the likelihood of intercolor bleed while maintaining high quality image formation.

Specific embodiments of the invention will now be described in detail. These Examples are intended to be illustrative only, and the invention is not limited to the materials, conditions or process parameters set forth in these embodiments. All parts and percentages are by weight in inks, unless otherwise indicated. Other embodiments and modifications of the present invention may occur to those skilled in the art subsequent to a review of the information presented herein; these embodiments and modifications, as well as equivalents thereof, are also included within the scope of this invention.

EXAMPLES

Example 1

A carbon black ink composition was prepared. The ink composition comprised the following components:

15.66% sulfolane, 15.56% Cab-O-Jet® 157, a carbon black dispersion from Cabot Corporation (a chemically modified anionic carbon black dispersion containing 15% carbon black solid), 7.66% 2-pyrrolidone, 0.05% polyethylene oxide (weight average molecular weight=18,500), 0.70% latex (BzMA/EtgMa/Ma with 55 parts benzyl methacrylate, 21 parts ethylene glycol methacrylate, 24 parts methacrylic acid; 35% solid content), 2.92% polyether(alkylenoxide)-polymethylsiloxane copolymer Tegopren 5884 (Goldschmidt Chemical Corp., 33.5% solid content), 0.85% t-butyl alcohol, and deionized water (balance).

The ink of this invention was filtered with a 1.0 micron glass filter and used for printing and image studies.

Example 2

An unmodified ink composition was also prepared as a reference, which does not include the low boiling point penetrant additive of the present invention. The reference ink composition comprised the following components:

15.79% sulfolane 15.69% Cab-O-Jet® 157, a carbon black dispersion from Cabot Corporation (a chemically modified anionic carbon black dispersion containing 15% carbon black solid), 7.72% 2-pyrrolidone 0.05% polyethylene oxide (weight average molecular weight=18,500)

0.71% latex (BzMA/EtgMa/Ma with 55 parts benzyl methacrylate, 21 parts ethylene glycol methacrylate, 24 parts methacrylic acid; 35% solid content), 2.94% polyether(alkylenoxide)-polymethylsiloxane copolymer Tegopren 5884 (Goldschmidt Chemical Corp., 33.5% solid content), and deionized water (balance).

The ink (reference or control) was filtered with a 1.0 micron glass filter and used for printing and image studies. The reference ink has a faster drying rate than the ink of Example 1.

Example 3

A yellow ink composition was prepared by simple mixing of the following ingredients followed by pH adjustment to neutral and filtration through a Nylon membrane filter of 0.8 micron:

| Ingredient | Supplier | Amount (parts by weight) |
| --- | --- | --- |
| deionized water | — | 0.785 |
| DOWICIL ® 150/200 biocide | Dow Chemical Co. | 0.1 |
| polyethylene oxide* | Polysciences | 0.05 |
| imidazole | BASF | 1 |
| ethylene diamine tetraacetic acid | Dow Chemical Co. | 0.065 |
| urea | Arcadian Corp. | 6 |
| sulfolane** | Phillips Petroleum Co. | 15 |
| acetylethanolamine*** | Scher Chemical | 16 |
| butyl carbitol | Van Waters & Rogers | 12 |

-continued

| Ingredient | Supplier | Amount (parts by weight) |
|---|---|---|
| PROJET ® YELLOW OAM dye**** | Zeneca Colors | 40 |
| | roll mill 30 minutes | |

*average molecular weight 18,500
**95 wt. % sulfolane, 5 wt. % water
***75 wt. % acetylethanolamine, 25 wt. % water
****Containing 7.5 wt. % Acid Yellow 23 dye in water Example 4

A Hewlett Packard® (HP) 855C thermal ink jet printer was used to produce multicolor ink jet images (including black lines) on a variety of plain papers, including NT (North American type) papers, Japanese type papers, and HP Bright White papers. The NT papers were: 1). 3NT (Recycled Bond paper, Domtar, Comwall-Ontario), 2). 7NT (Xerox Image Series LX), 3). 1ONT (Hammermill Tidal DP, International Paper Selma, Alabama), 4). 14NT (Champion Brazil), and 5). 18NT (Xerox 4024). The HP carbon black ink was removed from the ink cartridge and replaced with either the modified or reference carbon black inks, described above. Auto, Normal and Graphic modes were used with the HP 855C printer. The yellow ink of Example 3 was used for printing next to the carbon black inks (Example 1 or Example 2) for intercolor bleed studies. The Midrange Frequency Line Edge Noise (MFLEN), which is a way to evaluate line edge sharpness, was employed to evaluate line sharpness of the black line images (ink of Example 1) on different plain papers. MFLEN values were measured to quantify line edge raggedness for the black ink printed on various plain papers without a neighboring ink. The small MFLEN numbers indicate sharp image of the black ink on various plain papers. The MFLEN numbers were obtained by an equipment comprising a personal computer, an illuminating light source, a filter, and an imaging microscope with a CDD sensor (light sensor). The equipment was calibrated with a standard image (line with sharp edges). Software using a Fourier Transform technique was used to calculate the MFLEN data and line width.

Intercolor bleed was also measured and evaluated as a MFLEN value. Intercolor bleed (ICB) usually is caused by undesirable mixing of inks near the bordering areas and results in a distorted line image with irregular edges and large MFLEN values. The smaller intercolor bleed MFLEN number is desirable because it shows sharper line image with reduced intercolor bleed.

MFLEN and intercolor bleed data were collected by measuring at least three lines (three vertical lines or six horizontal lines) for each paper; the average values are shown in Tables I and II below.

TABLE I

Horizontal Line ICB and MFLEN Data of Example 1 and Example 2 Printed on Plain Papers Next the Yellow Ink (Example 3)

| Paper | Intercolor Bleed of Yellow Ink (Example 3) vs. Reference C.B. Ink (Example 2) | Intercolor Bleed of Yellow Ink (Example 3) vs. Modified C.B. Ink (Example 1) | MFLEN of Reference C.B. Ink (Example 2) | MFLEN of Modified C.B. Ink (Example 1) |
|---|---|---|---|---|
| 3NT | 69.7 | 49.3 | 1.6 | 2 |
| 7NT | 10.3 | 12.4 | 0 | 0.5 |
| 10NT | 20.2 | 12.9 | 20.2 | 19.2 |
| 14NT | 44 | 21.5 | 7.6 | 13.7 |
| 18NT | 84.4 | 42 | 1.1 | 0.5 |
| HP-BW | 12.9 | 11.9 | 9.8 | 10.1 |
| Average | 40.3 | 25 | 6.7 | 7.7 |

*Note: HP BW stands for Hewlett Packard Bright White Paper;

Lower ICB (Intercolor Bleed) value is better.

Yellow ink of Example 3 was printed next to each carbon black ink (Example 1 or Example 2, control). MFLEN stands for mid frequency line edge noise is desirable for lower value.

TABLE II

Vertical Line ICB and MFLEN Data of Example 1 and Example 2 Printed on Plain Papers Next the Yellow Ink (Example 3)

| Paper | Intercolor Bleed of Yellow Ink (Example 3) vs. Reference C.B. Ink (Example 2) | Intercolor Bleed of Yellow Ink (Example 3) vs. Modified C.B. Ink (Example 1) | MFLEN of Reference C.B. Ink (Example 2) | MFLEN of Modified C.B. Ink (Example 1) |
|---|---|---|---|---|
| 3NT | 48.9 | 32.1 | 6.1 | 6.9 |
| 7NT | 15.6 | 13.9 | 4.5 | 5.1 |
| 10NT | 21.5 | 15.5 | 17.7 | 17.1 |
| 14NT | 31.5 | 13.7 | 10.2 | 10.3 |
| 18NT | 75 | 26.2 | 6.4 | 6.9 |
| HP-BW | 13.4 | 15.2 | 11.1 | 13.9 |
| Average | 34.3 | 19.4 | 9.3 | 10 |

*Note: HP BW stands for "Hewlett Packard Bright White Paper"

Yellow ink of Example 3 was printed next to either carbon black ink of Example 1 or Example 2 (a control). MFLEN stands for "mid frequency line edge noise"

The intercolor bleed data (for both Horizontal and Vertical lines) clearly indicate that the modified ink, prepared according to the present invention comprising t-butyl alcohol, is superior to the unmodified or reference ink when printed on NT papers next to the yellow ink (Example 3). Moreover, the MFLEN data are comparable for both the modified and the reference inks. Thus, the present invention provides an ink composition and printing process that can produce high quality multi-color images with low MFLEN and minimal intercolor bleed on many plain papers.

Example 5

A carbon black ink was prepared comprising sulfolane (15%), 2-pyrrolidinone (6%), 15.69% Cab-O-Jet® 157 (a chemically modified anionic carbon black dispersion from Cabot Corporation (containing 15% carbon black solid), 0.05% polyethyleneoxide (Ave. M.W. of PEO is about 18,000), 0.5% Polyacrylamide solid content (From 50% Polyacrylamide solution with $M_w$=1500) polyacrylamide, isopropanol (3%), and deionized water (balance). The ink was filtered through a 1.0 micron glass filter. Physical properties: pH=7.3, Surface tension: 50.5 dyne/cm, and Viscosity=2.1 centipoises.

Example 6

A carbon black ink was prepared comprising sulfolane (15%), 2-pyrrolidinone (6%), 15.69% Cab-O-Jet® 157 (a chemically modified anionic carbon black dispersion from Cabot Corporation (containing 15% carbon black solid), 0.05% polyethyleneoxide (Ave. M.W. of PEO is about 18,000), 0.5% Polyacrylamide solid content (From 50% Polyacrylamide solution with $M_w$=1500) polyacrylamide, Sodium Dodecyl Sulfonate Salt (0.4%) and deionized water (balance). The ink was filtered through a 1.0 micron glass filter. Physical properties: pH=7.36, Surface tension: 41 dyne/cm, and Viscosity=1.82 centipoises.

Example 7

The aforementioned carbon black inks (Examples 5 and 6) were used in printing on a wide variety of plain papers including several NT papers (same as in Example 4) and Japanese papers. The Japanese plain papers were JP1 (Fuji Xerox S thin copier paper), JP5 (Fuji Xerox J color copier paper), JP9 (Nihonseishi L), JP10 (Fuji Xerox Green 100), and JP12 (Sharp PPC paper). The carbon black inks were placed in empty HP 855C black ink cartridges and printed at room temperature separately and also next to HP 855C Yellow ink using a HP 855C ink jet printer. The printer was operated in Auto, Normal and Graphic modes. The MFLEN and ICB data for Examples 5 and 6 on NT papers are shown in Tables III. The MFLEN and ICB data for Examples 5 on Japanese papers are shown in Table IV.

TABLE III

MFLEN and ICB Data of Examples 5 and 6 on NT Papers

| Paper | MFLEN Example 5 (K) | MFLEN Example 6 (K) | ICB(K/Y) Example 5 Next to HP 855C Yellow Ink | ICB(K/Y) Example 6 Next to HP 855C Yellow Ink |
|---|---|---|---|---|
| 3NT | 74 | 18.7 | 24.7 | 31 |
| 7NT | 0.8 | 2.7 | 8.7 | 15.4 |
| 10NT | 13 | 28 | 14.9 | 16.7 |
| 12NT | 25 | 39 | 13.7 | 16.7 |
| 13NT | 1.8 | 28.7 | 15.9 | 29.3 |
| 18NT | 1.1 | 1.5 | 16.2 | 34.2 |
| Ave. | 8.2 | 19.8 | 15.7 | 23.9 |

TABLE IV

MFLEN and ICB Data of Examples 5 on Japanese Papers

| Japanese Paper | MFLEN (K) | ICB(K/Y) |
|---|---|---|
| CJ1 | 5.4 | 21.3 |
| CJ5 | 3.4 | 23.1 |
| CJ9 | 2 | 19.3 |
| CJ10 | 4.9 | 188 |
| CJ12 | 9 | 3.7 |
| Ave. | 4.9 | 17.2 |

From Tables III and IV, it is clear that the ink comprising the low boiling alcohol (Isopropanol) has excellent MFLEN data on both NT and Japanese papers. Ink of Example 5 of this invention showed lower MFLEN values (Better Images) than ink of Example 6 on NT papers (Ave. MFLEN=8.2 vs 19.8). Ink of Example 5 also works very well when it is printed next to the HP 855C Yellow ink to give low intercolor bleed (Ave. ICB=15.7 and 17.2 on NT and Japanese plain papers respectively).

What is claimed is:

1. An ink jet printing process comprises printing a first ink and at least a second ink and a different colorant from the first ink onto a print substrate according to digital data signals in any desired printing order, wherein an ink jet composition of the first ink and second ink comprises water, a colorant, a first low boiling point penetrant additive having a boiling point less than or equal to about 115° C., and a second low boiling point penetrant having a boiling point of less than or equal to about 135° C.

2. An ink jet printing process of claim 1, wherein the colorant is carbon black either with or without chemical modification.

3. An ink jet printing process of claim 1, wherein the colorant is a dye or a mixture of dye and pigment.

4. An ink jet printing process of claim 1, wherein the low boiling point penetrant additive is an alcohol or a thiol.

5. An ink jet printing process of claim 1, wherein the first low boiling point penetrant additive is selected from the group consisting of 2-methyl-2-propanol, 1-methyl-1-propanol, 2-butanol, 2-methyl-1-propanol, isopropanol, 2-propyn-1-ol, ethanol, methanol, 2-buten-1-ol, 3-buten-2-ol, 3-butyn-2-ol, 1-butanethiol, t-butylthiol, 1-methyl-1-propanethiol, 2-methyl-1-propanethiol, 2-methyl-2-propanethiol, cyclopropanol, thiocyclopropanol, and mixtures thereof.

6. An inkjet printing process of claim 1, further comprising at least one member selected from the group consisting of a humectant, a surfactant, a pigment dispersing agent, a pH buffer, a biocide, an anti-curl agent, an anti-bleed agent, a jetting aid, a drying accelerating agent, a polymeric binder, an anti-clogging agent, and a latency enhancer.

7. An ink jet printing process of claim 1, wherein said low boiling point penetrant additive is present in an amount ranging from about 0.1% to about 8% by weight of the total weight of the ink composition.

8. The ink jet printing process according to claim 1, wherein the first ink is printed onto a print substrate first before the second ink is printed adjacent to the first ink and allows the second ink to dry quickly by evaporation and fast penetration into a surface of the print substrate with low intercolor bleed.

9. The ink jet printing process according to claim 1, wherein the second ink is printed first onto a print substrate before the first ink is printed adjacent to the second ink onto the print substrate.

10. The ink jet printing process according to claim 1, wherein the second ink is a carbon black ink comprising carbon black particles which are selected from a group consisting of chemically modified carbon black particles and/or carbon black particles stabilized by a pigment dispersing agent.

11. The ink jet printing process of claim 1, wherein the first ink is a dye-based color ink.

12. A multicolor ink jet printing process comprising:
  1) incorporating into an ink jet printer a first ink;
  2) incorporating into the ink jet printer at least one second ink comprising a first alcohol or thiol additive having a boiling point less than or equal to about 115° C. and a second alcohol or thiol additive having a boiling point ≦135° C.;
  3) causing droplets of said first ink to be ejected in an imagewise pattern onto a surface of a print substrate; and
  4) causing droplets of said at least one second ink to be ejected in an imagewise pattern onto the surface of the print substrate so that a multicolor ink image is formed on the print substrate that exhibits at least one of sharp line edges and minimal intercolor bleed.

13. The multicolor ink jet printing process according to claim 12, wherein the ink jet printer employs any desired printing order for printing the first and second inks.

14. The multicolor ink jet printing process according to claim 12, wherein said first ink is ejected onto the surface of the print substrate prior to ejecting said at least one second ink onto the surface of the print substrate.

15. The multicolor ink jet printing process according to claim 12, wherein the print substrate can be optionally heated at any stage of ink jet printing process including at least one of before, during and after printing.

16. The multicolor ink jet printing process according to claim 12, further comprising jetting at least one of the inks through a printhead capable of printing at least 300 spots per inch.

17. The multicolor ink jet printing process according to claim 12, wherein the printer employs a printing process selected from the group consisting of continuous stream ink jet printing and drop-on-demand ink jet printing which is selected from the group consisting of thermal ink jet printing, acoustic ink jet printing, and piezoelectric ink jet printing.

18. The multicolor ink jet printing process according to claim 12, wherein at least some of said first ink is printed a) on top, b) below, or c) adjacent to said at least one second ink.

19. The multicolor ink jet printing process according to claim 12, wherein the ink jet printer uses a printhead that is a partial width printhead, a partitioned printhead, or a full width array printhead.

20. The multicolor ink jet printing process according to claim 12, wherein said first ink is selected from the group consisting of a yellow ink, a cyan ink and a magenta ink.

21. The multicolor ink jet printing process according to claim 12, wherein said alcohol or thiol additive is selected from the group consisting of 2-methyl-2-propanol; 1-methyl-1-propanol; 2-butanol; 2-methyl-1-propanol; iso-propanol; 2-propyn-1-ol; 1-chloro, 1-propanol; ethanol; methanol; 2-buten-1-ol, 3-buten-2-ol; 3-buty2-2-ol; 1-butanethiol; t-butylthiol; 1-methyl-1-propanethiol; 2-methyl-1-propanethiol; 2-methyl-2-propanethiol; cyclopropanol; thiocyclopropanol; and mixtures thereof.

22. The multicolor inkjet printing process according to claim 12, wherein the alcohols or thiols with a boiling point $\leq 135°$ C. are selected from the group consisting of 3-methyl-1-butanol; 2,3-dimethyl, 1-butanol; 3,3-dimethyl, 1-butanol; 1-butanol; 2-methyl-1-butanol (d and l); 2,3,3-trimethyl-1-butanol; 2-pentanol, 3-pentanol; 2-pentanol; 2,4-dimethyl, 2-pentanol; 2-methyl, 2-pentanol; 3-methyl, 2-pentanol; 4-methyl, 3-pentanol; 2-methyl, 3-pentanol; 3-methyl, 1-propanol; 2-chloro, 1-propanol; 1-chloro, 1-propanol; 1-chloro, 2-methyl; 2,2-dimethyl-1-propanol (neopentyl alcohol); 3-fluoro-1-propanol; 1-methoxy-2-propanol; 1-ethoxy-2-propanol; 1-butanethiol, 2-methyl; 1-butanethiol, 3-methyl; and mixtures thereof.

23. An ink jet ink printing process of claim 1, wherein the colorant is a pigment other than carbon black.

* * * * *